US007834854B2

(12) United States Patent
Kim

(10) Patent No.: US 7,834,854 B2
(45) Date of Patent: Nov. 16, 2010

(54) KEYPAD BACKLIGHTING DEVICE

(75) Inventor: Kyoung-Youm Kim, Seoul (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 920 days.

(21) Appl. No.: 11/519,653

(22) Filed: Sep. 12, 2006

(65) Prior Publication Data

US 2007/0070043 A1 Mar. 29, 2007

(30) Foreign Application Priority Data

Sep. 23, 2005 (KR) ...................... 10-2005-0088828

(51) Int. Cl.
*G06F 3/02* (2006.01)
*H01H 9/00* (2006.01)

(52) U.S. Cl. ....................................... 345/170; 200/310

(58) Field of Classification Search ................. 345/170, 345/168; 200/310, 317; 313/503, 483; 362/612; 341/22, 175
See application file for complete search history.

(56) References Cited

U.S. PATENT DOCUMENTS 5,128,842 A 7/1992 Kenmochi ................... 362/95
6,158,867 A * 12/2000 Parker et al. .................. 362/29
7,432,463 B2 * 10/2008 Clegg et al. ................. 200/310
2001/0050371 A1 * 12/2001 Odaki et al. .................. 257/98
2004/0207313 A1 * 10/2004 Omoto et al. ............... 313/503
2005/0128767 A1 * 6/2005 Wang et al. ................. 362/555
2005/0167682 A1 * 8/2005 Fukasawa .................... 257/79
2005/0243576 A1 * 11/2005 Park et al. ................... 362/612
2006/0284847 A1 * 12/2006 Pate et al. ................... 345/168
2007/0171503 A1 * 7/2007 Luo ........................... 359/237

FOREIGN PATENT DOCUMENTS

FR 2863724 6/2005
JP 10-242513 9/1998
WO WO2005078563 A2 * 8/2005

OTHER PUBLICATIONS

Odaki, Tsutomu, et al.; Patent Application Publication No. US 2001/0050371 A1; Publication Date: Dec. 13, 2001; "Light-Emitting Diode Device;" . . . .
"Weisser als Weiss;" Elektronikpraxis; Oct. 9, 1998; XP008093329.

* cited by examiner

*Primary Examiner*—Kevin M Nguyen
(74) *Attorney, Agent, or Firm*—Cha & Reiter, LLC

(57) ABSTRACT

A keypad backlighting device includes a light source having an emission chip and a fluorescent material applied to the emission chip. The emission chip and the fluorescent material interact with each other and generate white light. The light source can realize white light by means of interaction between the emission chip and the fluorescent material applied thereto. This improves the reproduction properties of the backlight color of the keypad. In addition, the device has an elastic pad configured for guiding light from the light source to key tops attached to the pad. This reduces the number of light sources and saves on the cost of manufacturing.

19 Claims, 4 Drawing Sheets

KEYPAD BACKLIGHTING DEVICE

CLAIM OF PRIORITY

This application claims priority to an application entitled “Keypad Backlighting Device” filed with the Korean Intellectual Property Office on Sep. 23, 2005 and assigned Serial No. 2005-88828, the contents of which are incorporated herein by reference.

BACKGROUND

The present invention relates to a keypad of a terminal such as a cellular phone, the handset or base of a wired or wireless telephone, or an electronic organizer, and more particularly to a keypad backlighting device.

In general, portable or handheld terminals are provided with a keypad as an input device for inputting information, searching stored information and multimedia files for execution, and selecting menus. Although a touch screen may be used as the input device while also acting as a display device, it is the keypad, composed of an array of a number of keys, which is typically used for input, search, and execution functions. The keypad is provided with a backlighting device to enable users to easily recognize and operate it even in the dark.

FIG. 1 is a sectional view showing the construction of a keypad provided with a backlighting device according to the prior art. As shown in FIG. 1, the keypad 100 includes a PCB 101 having dome switches 111 arranged on a surface thereof and a silicon pad 102 having a number of key tops 123 arranged thereon. The PCB 101 may be a flexible PCB, if necessary.

The key tops 123 are positioned in such a manner that they correspond to the respective dome switches 111. The silicon pad 102 has contact protrusions 121 formed thereon while facing the corresponding dome switches 111. When the user operates the key tops 123, the silicon pad 102 deforms accordingly. As a result, the contact protrusions 121 press and actuate the corresponding dome switches 111. The key tops 123 have characters printed thereon, which correspond to key values assigned thereto, respectively, so that the user can recognize the characters and functions assigned to the key tops 123 and operate them as desired.

The keypad is provided with a lighting device, which uses a light source 113 (e.g. LED), so that it can be used conveniently even in the dark. According to the user’s setting, the lighting device lights the keypad either every time it is used or only at night.

The light sources 113 composing the lighting device are positioned on the PCB 101 and below both sides of the respective key tops 123. Light generated by the light sources 113 diffuses through the silicon pad 102 and lights the characters printed on the key tops 123.

However, light sources 113 of conventional lighting devices, constructed as above, are monochrome emitters and light the keypad 100 in a uniform manner. The number of light sources required consequently equals or exceeds the number of keys constituting the keypad. This complicates the assembly process and increases the cost of manufacturing. In particular, the installation a large number of LEDs on the PCB inevitably complicates the printed circuit pattern and entails an additional installation process. This increases the manufacturing cost. Moreover, any difference in luminance among the light sources makes the overall lighting of the keypad uneven.

In order to satisfy the users’ various tastes and demands regarding portable terminals, manufacturers are trying to diversify not only the design and function of terminals, but also the color of light used for illuminating the keypad. Using conventional monochrome emitters as light sources in order to realize various colors, however, requires the additional installing of light sources for generating different colors. Alternatively, a single package may provide a number of emission chips for generating different colors. In either case, it is difficult to realize desired colors, because of luminance differences in the light generated by respective light sources and the resulting difference in color, to say nothing of increased manufacturing cost.

Generating white light requires the mixing of red, green, and blue lights. However, variation in characteristics of elements used in the manufacturing process, i.e., light sources or emission chips for generating different colors, makes it difficult to realize brilliant white light.

SUMMARY OF THE INVENTION

The present invention has been made to solve the above-mentioned problems occurring in the prior art.

In one aspect, a keypad backlighting device according to the present invention is capable of providing backlight of various and brilliant colors.

In another aspect, a keypad backlighting device has a lower manufacturing cost.

In still another aspect, a keypad backlighting device is capable of realizing brilliant white light.

In short, a keypad backlighting device includes a light source having an emission chip and a fluorescent material applied to the emission chip, the emission chip and the fluorescent material interacting with each other and generating white light.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

In the following description of the present invention, detailed description of known functions and configurations incorporated herein is omitted for clarity of presentation.

Figure 1:
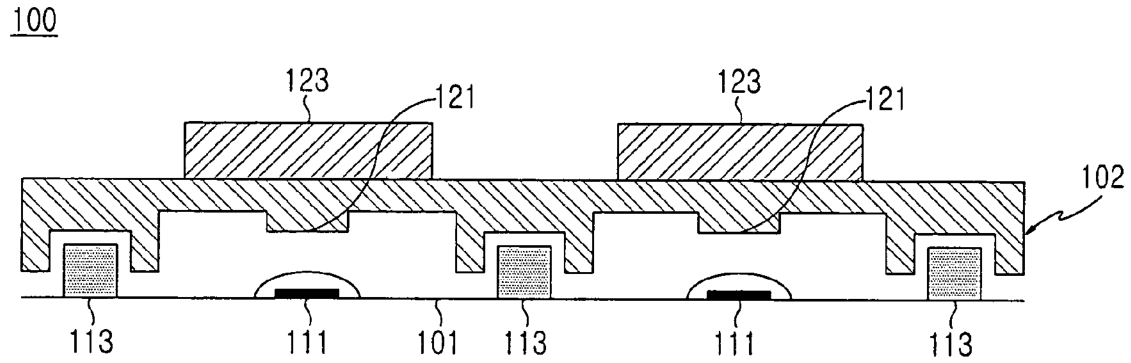
FIG. 1 is a sectional view showing the construction of a keypad provided with a backlighting device according to the prior art.
Figure 2:
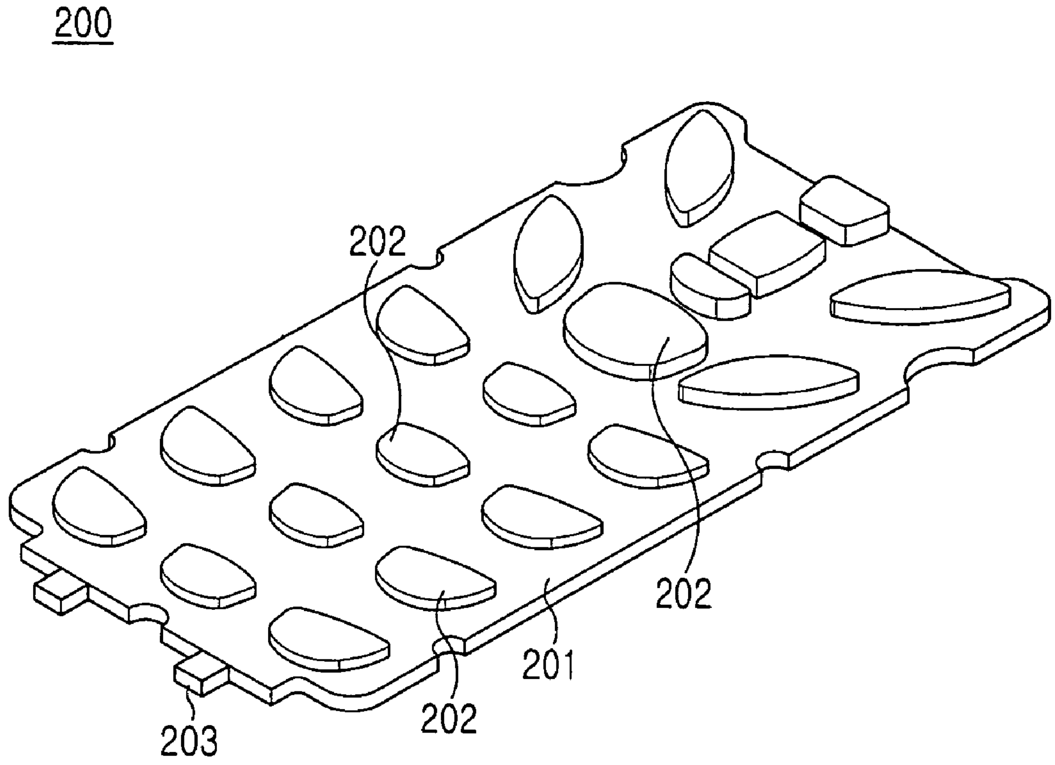
FIG. 2 is a perspective view showing a keypad provided with a backlighting device according to a preferred embodiment of the present invention.

As shown in FIG. 2, by way of illustrative and non-limitative example, a keypad 200 provided with a backlighting device according to a preferred embodiment of the present invention includes a light source 203 and an elastic pad 201 adapted to guide light generated from the light source. The pad 201 has a number of key tops 202 attached to a surface thereof.

The key tops 202 have numerals or characters printed thereon, which correspond to key values assigned thereto, respectively, so that the user can recognize the numerals or characters and operate the key tops as desired. The key tops 202 are generally made of an injection material. Alternatively, the key tops 202 may be metallic thin plates attached to the front surface of the elastic pad 201 for reduced thickness. Those skilled in the art can easily select and modify the method for manufacturing the key tops 202.

The elastic pad 201 includes a waveguide layer for guiding light generated from the light source 203. The light from the light source 203 is thereby guided to a plurality of key tops 202. The elastic pad 201 may have a partial silicon or urethane layer having elastic restoration properties so that the key tops 202 can be attached thereto easily. Alternatively, the elastic pad 201 may be a single layer made of silicon or urethane, which has elastic restoration properties, as long as enough transparency to guide light from the light source 203 can be secured.

Figure 3:
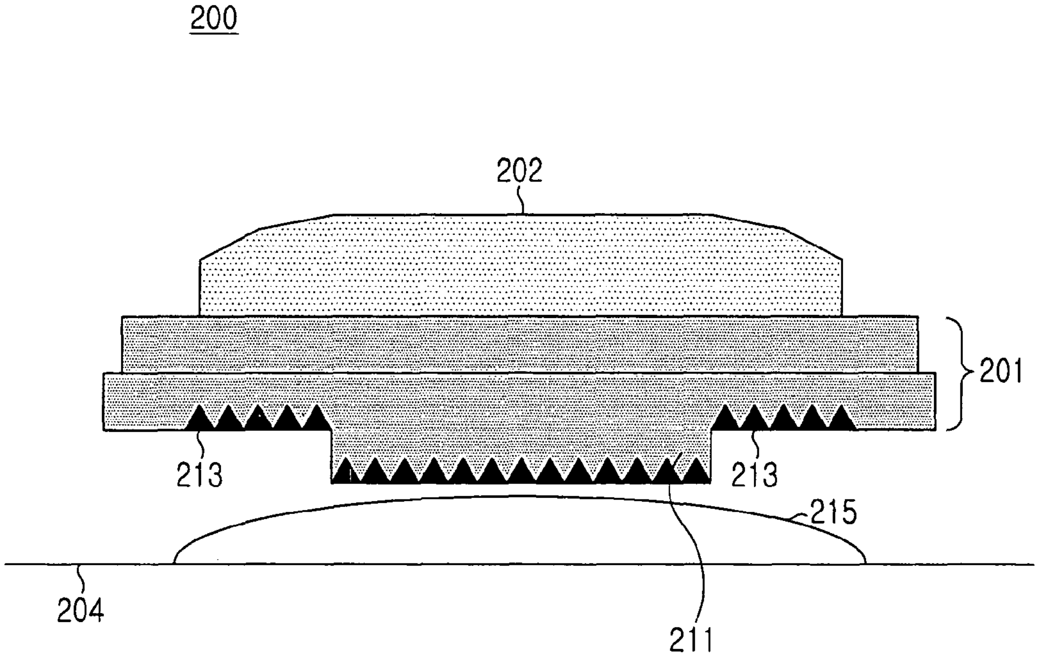
FIG. 3 is a sectional view showing the construction of the keypad shown in FIG. 2.

Referring to FIG. 3, the elastic pad 201 has contact protrusions 211 formed on the other surface thereof while corresponding to the key tops 202. When the user operates the key tops 202, underlying dome switches 215 are actuated. The dome switches 215 are positioned on a PCB 204 inside the terminal. More specifically, the keypad 200 is positioned on top of the PCB 204, on which the dome switches 215 are positioned, inside the terminal.

The elastic pad 201 has reflection patterns 213 that may be implemented as a surface which is uneven or not flat. Light generated from the light source 203 and guided inside the elastic pad 201, is accordingly, upon incidence with the surface, directed to the exterior in a path that lights the key tops 202. Therefore, the irregular reflection patterns 213 are preferably formed in regions corresponding to attachment position of the key tops 202. As shown in FIG. 3, the irregular patterns 213 may be coextensively aligned with respective key tops 202. In the exemplary embodiment shown, the patterns 213 are implemented as slanted surfaces joined pairwise to form respective angles. When the irregular patterns 213 are spaced from the light source 203, it is preferred to form them densely or in a large size so that uniform brightness can be secured throughout the elastic pad 201.

Figure 4A:
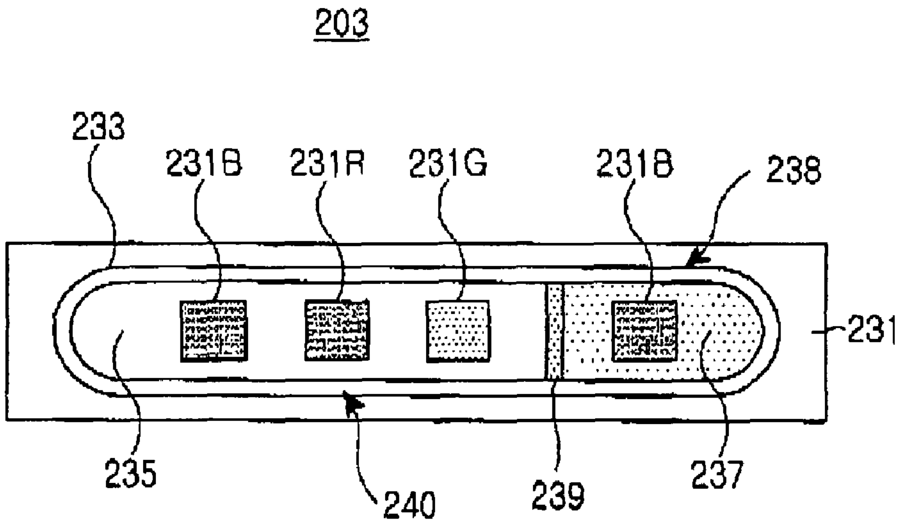
FIGS. 4A, 4B show the structure of a light source of the backlighting device shown in FIG. 2.

As seen in the side view depicted in FIG. 4A, the light source 203, in an exemplary embodiment, includes at least one blue emission chip, particularly a pair of blue emission chips 231B, together with red and green emission chips 231R 231G, in order to realize various colors of light. The light source 203 is mounted on a side of the elastic pad 201 and generates light, which is incident on the elastic pad 201. The light source 203 may, as seen in FIG. 2, be positioned to emit the light in a direction substantially parallel to the elastic pad and normal to a direction of actuation of the key top 202 by the user. The light source 203 includes a chip base 231, which has a receiving groove 233 formed on a surface thereof, so that the emission chips 231R, 231G, 231B are successively positioned therein.

The receiving groove 233 has a barrier 239 positioned therein to divide it into two spaces. A first 238 of the two spaces has the blue emission chip 213B mounted therein and is filled with a fluorescent material 237. The blue emission chip 231B and the fluorescent material 237 generate white light. In particular, the fluorescent material 237 receives external light and realizes yellow light. Yellow light from the fluorescent material 237 and light from the blue emission chip 231B are mixed and realize white light.

A second space 240 of the receiving groove 233 has the green, red, and blue emission chips 231G, 231R, 231B mounted therein and is filled with a protective material 235, such as resin or epoxy. The order of mounting the green, red, and blue emission chips 231G, 231R, 231B can be modified as desired. However, it is preferred to mount the green emission chip 231G in a position closest to the first space 238, and the blue emission chip 231B in a position farthest from the first space, in order to minimize interference of the fluorescent material 237 with light from other emission chips.

The positioning of barrier 239 between the two spaces 238, 240 minimizes interference between light from the fluorescent material 237 and light from the emission chips 231G, 231R, and 231B.

Figure 4B:
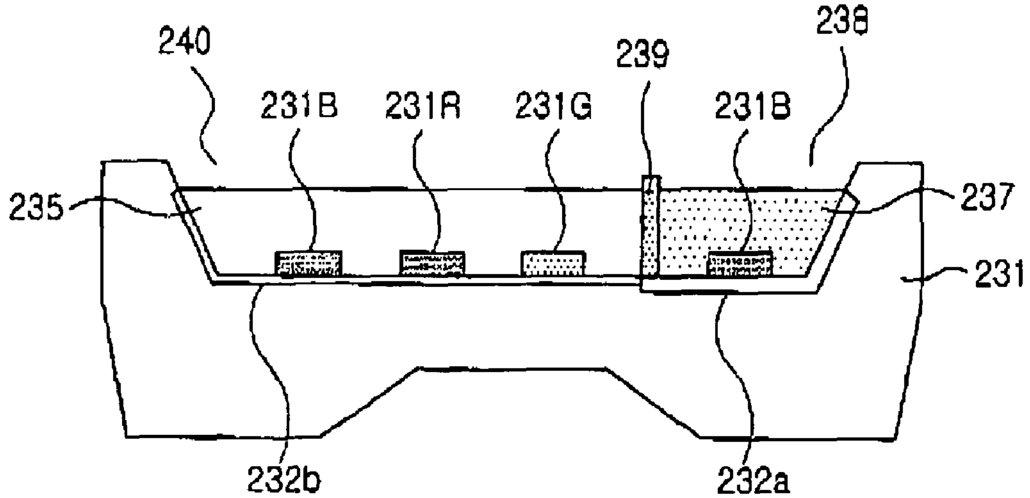

Referring to a top view shown in FIG. 4B, the light source 203 may have reflectors 232*a*, 232*b*, in order to direct light from the emission chips 231G, 231R, 231B in a predetermined direction. The reflectors 232*a*, 232*b* may be fabricated as a unit integral with the chip base 231 by initially processing metal plates into a shape corresponding to that of the receiving groove 233, polishing reflective surfaces, and performing insert injection. Alternatively, the reflectors 232*a*, 232*b* may be formed by applying a metallic material to the inner wall of the receiving groove 233. In the case of the light source 203 shown in FIG. 4A, B, molding is inserted to fabricate the reflector 232*a* as a unit integral with the barrier 239 and mounted on the chip base 231 in the first space 238, which is filled with the fluorescent material 237. The reflector 232*b* is formed by applying a metallic material to the inner wall of the second space 240. Those skilled in the art can easily understand that, considering the overall manufacturing process of the light source 203, it is preferable to fabricate both reflectors 232*a*, 232*b* using a single method, e.g., either the insert injection method or the metallic material method.

The light source 203, constructed as above, realizes white light by means of interaction between the fluorescent material 237 and the blue emission chip 231B, both of which are positioned in the first space 238, as well as various colors of light from the green, red, and blue emission chips 231G, 231R, 231B, which are positioned in the second space 240.

As mentioned above, the keypad backlighting device according to the present invention is advantageous in that it has a light source 203 capable of realizing various colors of light using green, red, and blue emission chips 231G, 231R, 231B, as well as white light by means of interaction between a separate emission chip and a fluorescent material 237 applied thereto. This improves the reproduction properties of the backlight color of the keypad. In addition, the device has an elastic pad 201 adapted to guide light from the light source 203 through the pad for distribution up to key tops 202 attached to the pad. This reduces the number of light sources and saves on the cost of manufacturing.

While the invention has been shown and described with reference to certain preferred embodiments thereof, it will be understood by those skilled in the art that various changes in form and details may be made therein without departing from the spirit and scope of the invention as defined by the appended claims. For example, although a blue emission chip is combined with a fluorescent material for realizing yellow light to generate white color in an exemplary embodiment of the present invention, a green or red emission chip may be combined with a fluorescent material for realizing a different color of light to thereby generate white color.

What is claimed is:

1. A keypad backlighting device comprising:

a light source having an emission chip; and a fluorescent material applied to the emission chip, the emission chip and the fluorescent material interacting with each other and generating white light; and wherein the light source has a chip base and a barrier, the chip base has a surface and a receiving groove formed on said surface, the barrier divides the receiving groove into first and second spaces, the first space has the emission chip mounted therein to generate blue light and the first space is filled with the fluorescent material to realize yellow light, and the second space has green, red and blue emission chips mounted therein.

2. The keypad backlighting device as claimed in claim 1, configured such that said generating white light involves mixing the generated blue light with the realized yellow light.

3. The keypad backlighting device as claimed in claim 1, said light source being oriented to introduce, into said keypad, light in a direction substantially parallel to the keypad and substantially normal to a direction of key actuation by a user.

4. The keypad backlighting device as claimed in claim 1, further comprising:

a keypad having keys with respective tops; and a pad that includes a pattern having slanted surfaces to direct light from said light source to a top from among said respective tops.

5. The keypad backlighting device of claim 4, wherein said pad includes another pattern having slanted surfaces to direct light from said light source to another top from among said respective tops.

6. The keypad backlighting device of claim 4, wherein said pattern is coextensively in alignment with said top of a key.

7. The keypad backlighting device as claimed in claim 1, further comprising a pad having a pattern that entails slanted surfaces for directing light to a key top.

8. The keypad backlighting device as claimed in claim 7, wherein said surfaces are joined to form angles.

9. The keypad backlighting device as claimed in claim 7, wherein the pad has another pattern that entails slanted surfaces for directing light to another key top.

10. The keypad backlighting device as claimed in claim 1, wherein green, red, and blue emission chips are arranged linearly in the other space, the green emission chip is placed in a position closest to the first space, and the blue emission chip is placed in a position farthest from said first space.

11. The keypad backlighting device as claimed in claim 1, wherein the receiving groove has an inner wall and a reflector positioned on said inner wall.

12. The keypad backlighting device as claimed in claim 11, wherein the reflector is formed by applying a metallic material to said inner wall.

13. The keypad backlighting device as claimed in claim 11, wherein the reflector is formed by processing a metallic plate into a shape corresponding to a shape of the receiving groove and mounting the plate on said chip base by insert injection.

14. The keypad backlighting device as claimed in claim 13, wherein said pad has a region and, formed in said region, a reflection pattern implemented as an uneven surface, the key top being attached in said region, to guide light from the light source towards the key top.

15. The keypad backlighting device as claimed in claim 14, wherein the pattern entails slanted surfaces.

16. The keypad backlighting device as claimed in claim 14, wherein said surfaces are joined to form angles.

17. The keypad backlighting device as claimed in claim 14, wherein said pad further comprises a contact protrusion formed in said region, and a dome switch is disposed under the contact protrusion and actuated by the contact protrusion.

18. The keypad backlighting device as claimed in claim 1, further comprising an elastic pad having at least one key top attached to said pad, a numeral or character being printed on a surface of the key top, and at least one light source being mounted on a side of said pad, wherein light generated from the light source is guided inside said pad.

19. The keypad backlighting device as claimed in claim 1, wherein the second space is filled with a protective material.

* * * * *